3,167,040
AUTOMATIC DUMP TYPE CHARCOAL LIGHTER
Garner B. Byars, Sr., Lavaughn Johnson, and Hugh W. King, Corinth, Miss., assignors to Auto Fire Corporation, Corinth, Miss., a corporation of Mississippi
Filed July 6, 1962, Ser. No. 208,688
4 Claims. (Cl. 110—1)

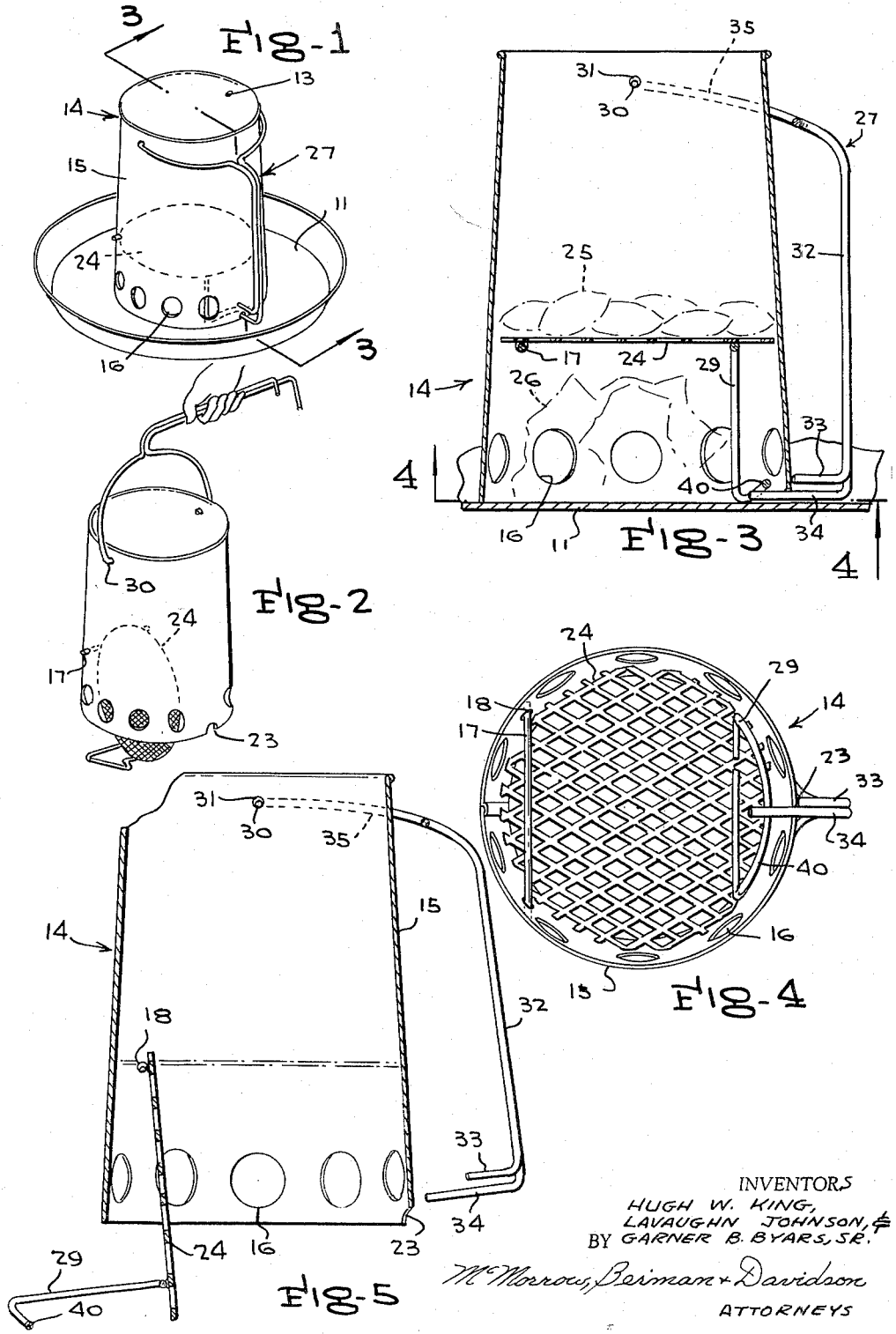

This invention relates to fuel ignition devices, and more particularly to a device for igniting charcoal for use in a barbecue type charcoal burner.

The main object of the invention is to provide a novel and improved charcoal igniting device which is relatively simple in construction, which is easy to use, and which assures positive ignition of charcoal so as to elevate the charcoal to the proper temperature for continued ignition thereof in a charcoal burner of the barbecue type.

A further object of the invention is to provide an improved charcoal ignition device which can be employed with a conventional charcoal burner, the device being relatively inexpensive to fabricate, being durable in construction, and providing a means for igniting charcoal in a relatively short period of time without requiring the use of special starting liquids or other material, other than relatively inexpensive and inflammable material, such as newspaper, or the like.

A still further object of the invention is to provide an improved starting device for use with a conventional charcoal burner of the barbecue type, the device being provided with means for supporting a quantity of charcoal in a position such that the charcoal may be easily ignited, for example, by means of burning newspaper, or similar cheap combustible material placed therein, the starting device being provided with means for automatically depositing the burning charcoal into the charcoal burner as the device is removed from the charcoal burner, the device being provided with simple and safe means for handling same.

Further objects and advantages of the invention will become apparent from the following description and claims, and from the accompanying drawings, wherein:

FIGURE 1 is a perspective view of a charcoal burner of the barbecue type provided with an improved charcoal starting device constructed in accordance with the present invention.

FIGURE 2 is a perspective view of the charcoal lighting device, shown as it is in the process of dumping the burning charcoal, in which position the lifting handle is grasped and the grate is allowed to drop to a depending position.

FIGURE 3 is an enlarged vertical cross sectional view taken substantially on the line 3—3 of FIGURE 1.

FIGURE 4 is a view of the device taken substantially on the line 4—4 of FIGURE 3, showing the grate with its hinge rod and supporting leg.

FIGURE 5 is an enlarged vertical cross sectional view taken in the same plane as FIGURE 3, but showing the device as it is in the process of dumping.

Referring to the drawings, 11 designates the generally circular holder or pan of a conventional charcoal burner of the barbecue type.

Designated generally at 14 is a charcoal starting device constructed in accordance with the present invention. The starting device 14 comprises a downwardly flaring tubular housing 15 of sheet metal, provided at its lower portion with a plurality of spaced air intake openings 16. Designated at 24 is a circular grate member rotatably supported inside the housing 15 above the apertures 16 by a hinge rod 17 welded to the grate member 24 and extending through openings 18, 18 formed in the housing 15. The grate member 24 is also provided with a leg 29 in the form of a loop having an arcuate laterally offset bottom bight portion 40. The top end portions of member 29 are welded to the bottom of the grate opposite the hinge rod 17. Bight portion 40 normally rests on the perpendicularly extending bottom lug portion 34 of a lifting handle assembly 27.

The lifting handle assembly 27 comprises two rods which are welded together along a middle portion of their length to form a straight handle 32. At the upper end of the handle 32 the rods diverge to form a bail section 35. Each rod terminates at its end in an inwardly directed lug 30. The lugs engage in diametrically opposed openings 31, 31 formed in the top portion of housing 15.

The lower end of the lifting handle assembly terminates in a latching arrangement comprising a perpendicularly extending, inwardly directed stop rod 33 which normally contacts the surface of housing 15, and the perpendicularly extending inwardly directed latching rod 34, which normally engages under and supports the leg 29 beneath the bight portion 40, shown in FIGURE 3. Latching rod 34 extends through a notch 23 formed in the bottom edge of housing 15.

The lifting handle assembly 27 is rotatable on the lugs 30, 30 in openings 31, 31 so that it may swing outwardly in a counterclockwise direction, as viewed in FIGURE 3, and will be limited when it has been swung so that the bail portion 35 has been rotated through an angle of approximately 180°, said bail portion 35 being engageable with the opposite side of the housing 15 to limit further rotation thereof. Clockwise swinging rotation of the assembly 27 is limited by the engagement of the stop rod 33 with the bottom portion of housing 15, for example, as shown in FIGURE 3.

In using the charcoal lighting device 14. the grate 24 and the lifting handle assembly 27 are arranged in the position thereof illustrated in FIGURES 1 and 3, namely, with the grate horizontally supported by the latching rod 34, and the device is placed in the charcoal holder 11. A quantity of inflammable material, such as crumpled newspaper, or the like, as shown in dotted view at 26 in FIGURE 3, is placed in the lower portion of the housing 15 and the housing is placed on the central part of the bottom wall of holder 11. The charcoal briquettes, shown in dotted view at 25, are than placed on the grate 24. The crumpled newspaper is then ignited by inserting a lighted match through one of the apertures 16, and the combustion of the newspaper creates an intense heat in the region immediately adjacent to the charcoal briquettes 25, the combustion thereof being aided by a draft created by the entry of air through the apertures 16 and the subsequent upward movement of the gaseous products of combustion through the relatively tall stack defined by housing 15. The charcoal 25 may then be heated to a sufficiently high temperature to cause ignition thereof without requiring the use of liquid starting material, as has been heretofore required.

After the charcoal briquettes 25 have become ignited, the handle member 32 is grasped and the bail and handle assembly 27 is pulled outwardly, disengaging the latching rod 34 from beneath the bight portion 40 of the leg 29. Since the leg 29 is of sufficient length so that it is engageable with the bottom of the holder 11, as shown in FIGURE 3, the grate 24 remains in horizontal position. However, the device 14 may then be lifted up by means of the handle assembly 27. This allows the grate to rotate by gravity on hinge rod 17 and to drop to a depending position, for example, as shown in FIGURE 5, allowing the burning charcoal briquettes to be deposited on the bottom wall of the holder 11. The charcoal brazier 11 is then free to be employed in the usual manner.

While a specific embodiment of an improved charcoal starting device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A charcoal starter comprising a tubular housing of substantial height adapted to rest vertically on a subjacent supporting surface and to at times be lifted away from said supporting surface, a grate pivoted in the housing, and depending leg means fixedly secured to the grate, said depending leg means being of sufficient length to engage said subjacent supporting surface and retail the grate in a substantially horizontal position and to allow the grate to drop by gravity when the housing is lifted away from said supporting surface.

2. A charcoal starter comprising a tubular housing of substantial height, a grate pivoted in the housing, depending leg means secured to the grate and being of sufficient length to at times engage a subjacent supporting surface and retain the grate in a substantially horizontal position, a holding member pivoted to the housing, and means on said holding member supportingly engageable with said leg means to retain the grate in said substantially horizontal position, said holding member being rotatable sufficiently to disengage from the leg means and release the grate.

3. A charcoal starter comprising a tubular housing of substantial height, a grate pivoted in the housing, depending leg means secured to the grate, a holding member pivoted to the housing, and means on said holding member supportingly engageable with said leg means to retain the grate in a substantially horizontal position, said holding member being rotatable sufficiently to disengage from the leg means and release the grate, said holding member comprising a bail receiving the upper portion of the housing, and a carrying arm extending from the intermediate portion of said bail, and said last-named means comprising a latch rod directed inwardly from the bottom end of the carrying arm.

4. A charcoal starter comprising a tubular housing of substantialy height, a grate pivoted in the housing, depending leg means secured to the grate, a holding member pivoted to the housing, and means on said holding member supportingly engageable with said leg means to retain the grate in a substantially horizontal position, said leg means being of sufficient length to engage a subjacent supporting surface and retain said grate in said substantially horizontal position, said holding member being rotatable sufficiently to disenage from the leg means and release the grate to allow said grate to drop downwardly by gravity when the housing is lifted from the subjacent supporting surface.

References Cited in the file of this patent
UNITED STATES PATENTS

| | | |
|---|---|---|
| 145,360 | Moore | Dec. 9, 1873 |
| 256,894 | Hare | Apr. 25, 1882 |
| 300,904 | Schreiner | June 24, 1884 |
| 558,715 | Bradley | Apr. 21, 1896 |
| 917,329 | Lyoons | Apr. 6, 1906 |
| 950,414 | Sweley | Feb. 22, 1910 |
| 2,668,427 | Seeley | Feb. 9, 1954 |
| 2,920,614 | Phelps | Jan. 12, 1960 |